United States Patent [19]

Tanaka

[11] Patent Number: 5,487,960
[45] Date of Patent: Jan. 30, 1996

[54] NONAQUEOUS SECONDARY BATTERY

[75] Inventor: Mitsutoshi Tanaka, Kanagawa, Japan

[73] Assignee: Fuji Photo Film Co., Ltd., Kanagawa, Japan

[21] Appl. No.: 434,052

[22] Filed: May 3, 1995

[30] Foreign Application Priority Data

May 12, 1994 [JP] Japan .................................. 6-098673

[51] Int. Cl.⁶ .............................. H01M 4/36; H01M 4/02
[52] U.S. Cl. ........................... 429/218; 429/193; 429/223; 429/224
[58] Field of Search ................................ 429/218, 223, 429/224, 193

[56] References Cited

U.S. PATENT DOCUMENTS

| | | | |
|---|---|---|---|
| 4,956,248 | 9/1990 | Furukawa et al. | 429/194 |
| 5,013,620 | 5/1991 | Miyazaki et al. | 429/194 |
| 5,273,848 | 12/1993 | Noguchi et al. | 429/218 |
| 5,366,830 | 11/1994 | Koksbang | 429/218 |

*Primary Examiner*—Prince Willis, Jr.
*Assistant Examiner*—Richard H. Lilley, Jr.
*Attorney, Agent, or Firm*—Sughrue, Mion, Zinn, Macpeak & Seas

[57] ABSTRACT

A nonaqueous secondary battery comprising a positive electrode and a negative electrode, in which a mixture of the positive electrode active material contains an acid containing at least one of P, B, Si, Mo, and W or a salt thereof. The battery has improved safety in case of abrupt temperature rise.

12 Claims, 1 Drawing Sheet

5,487,960

NONAQUEOUS SECONDARY BATTERY

FIELD OF THE INVENTION

This invention relates to a nonaqueous secondary battery using a lithium-containing transition metal oxide as a positive electrode active material and having improved safety.

BACKGROUND OF THE INVENTION

JP-B-4-60302(the term "JP-B" as used herein means an "examined published Japanese patent application") discloses a technique for preventing an increase of impedance in the inside of batteries during storage by adding a borate, a silicate, etc. of an alkali metal or an alkaline earth metal to a mixture of the positive electrode active material comprising manganese dioxide.

In order to improve safety in case of an overcharge, it has been suggested to add lithium oxalate to $LiCoO_2$ (JP-A-4-329269, the term "JP-A" as used herein means an "unexamined published Japanese patent application") or to add lithium carbonate to $LiCoO_2$ (JP-A-4-329268 and JP-A-4-328278). However, these techniques cannot reduce the occurrence of rupture in case of rapid temperature rise or heating.

Nonaqueous batteries using a lithium-containing transition metal oxide, such as $LiCoO_2$, $LiNiO_2$ or $LiMn_2O_4$, as a positive electrode active material and a substance capable of intercalating and deintercalating a lithium ion (e.g., an Li-containing metal oxide or calcined carbonaceous material) as a negative electrode active material have a higher cut-off voltage in charging than conventional alkali batteries, usually of from 3.5 to 5 V, and have been attracting attention as high-energy density and high-safety batteries. A wide variety of the nonaqueous batteries have been put to practical use (JP-A-55-136131 and JP-B-3-30146).

SUMMARY OF THE INVENTION

An object of the present invention is to provide a nonaqueous secondary battery having improved safety in case of abrupt temperature rise, which is capable of intercalating and deintercalating a lithium ion and has a charging cut-off voltage of 3.5 to 5 V.

The above object of the present invention is accomplished by a nonaqueous secondary battery in which a mixture of the positive electrode active material contains an acid containing at least one of P, B, Si, Mo, and W or a salt thereof.

Figure 1:
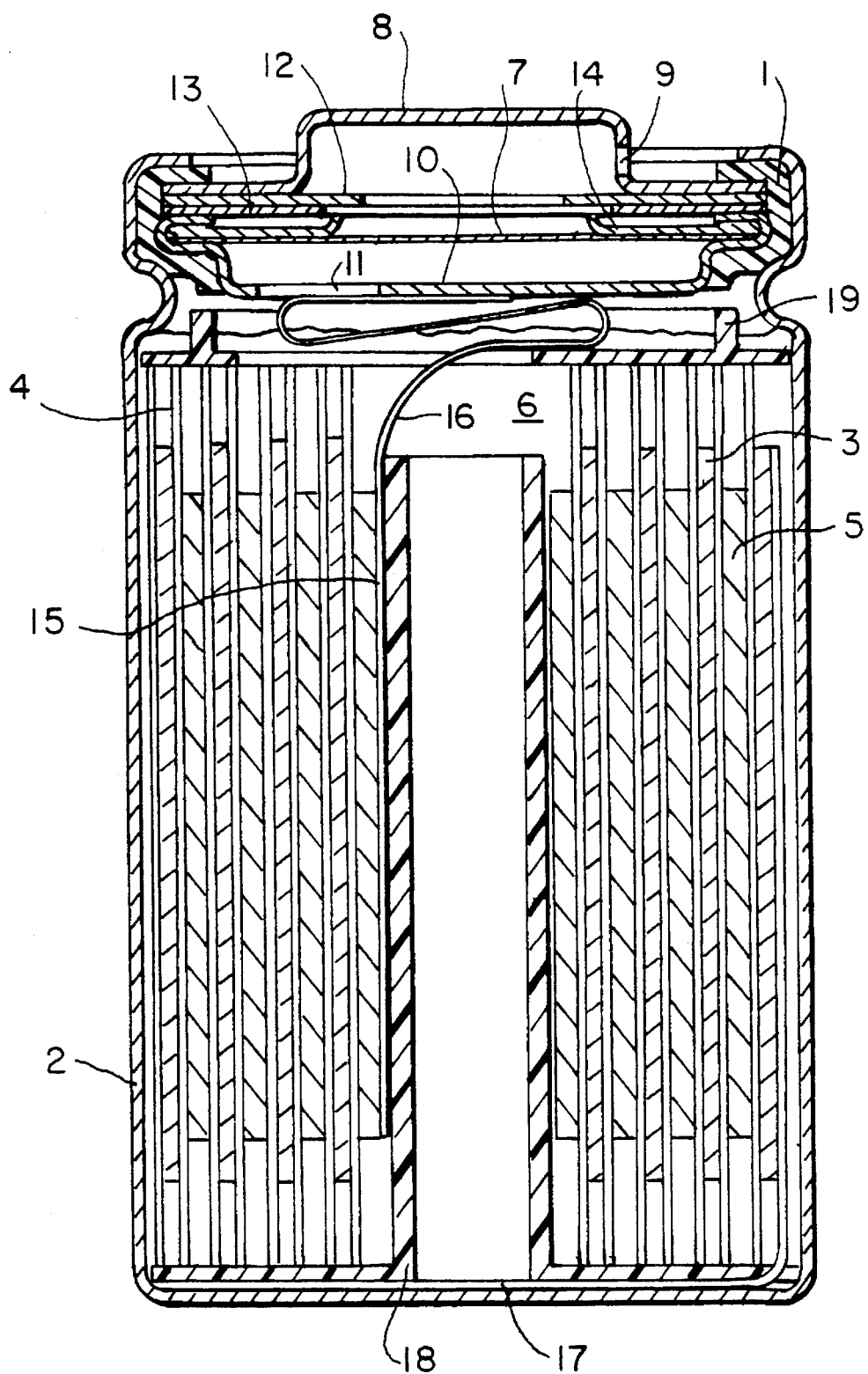
FIG. 1 is a cross section of a cylindrical battery (diameter: 17 mm; height: 50 mm) according to the present invention.

The numerals in FIG. 1 are shown below.

1 Gasket made of the synthetic resin (polypropylene)
2 Battery case having a function as a negative electrode terminal
3 Negative electrode(sheet)
4 Separator
5 Positive electrode (sheet)
6 Electrolytic solution
7 Safety valve
8 Positive electrode cap having a function as a positive electrode terminal
9 Vent hole of safety valve
10 Sealing plate
11 Hole of safety valve
12 Ring-shaped PCT element
13 Ring
14 Ring
15 Positive electrode lead
16 Positive electrode lead (a portion of insulating tape to be adhered)
17 Negative electrode lead
18 Insulating member for insulating core and bottom portions
19 Top-insulating plate For the sake of convenience, the positive electrode, negative electrode, and separator are depicted with the thickness magnified by 3 (the number of turns is reduced to ⅓), and the body is depicted with the length (corresponding to the length of the negative electrode can) reduced to ½.

DETAILED DESCRIPTION OF THE INVENTION

The positive electrode active material which can be used as the positive electrode in the present invention is not particularly limited as long as it achieves a charging cut-off voltage of 3.5 to 5 V. Examples of such the active material include lithium-containing transition metal oxides containing at least one, of Co, Mn and Ni, such as $LiCoO_2$, $LiNiO_2$, and $LiMn_2O_4$.

$LiCoO_2$ as a positive electrode active material may contain a minor proportion of other elements as is represented by formula(I):

$$Li_xCO_{y1}M_{y2}O_z \quad (I)$$

wherein M represents an element selected from the group consisting of Ni, V, Fe, Mn, Ti, and Cu; x is a value varying on charging and discharging and is from 0.7 to 1.20 as measured immediately after calcination; $y_1+Y_2=1$, and $Y_1$ is from 0.75 to 1.0, with $Y_2$ being from 0.25 to 0; and z is a value varying depending on $Y_1$, $Y_2$, and the valency of M and is preferably from 1.5 to 3.0.

Examples of suitable compounds represented by formula (I) include $LiCoO_2$, $Li_{0.97}CoO_z$, $LiCo_{0.9}Ni_{0.1}O_z$, $LiCo_{0.95}V_{0.05}O_z$, $LiCo_{0.98}C_{0.02}O_z$, $LiCo_{0.75}Fe_{0.25}O_z$, $LiCo_{0.75}Mn_{0.25}O_z$, $LiCo_{0.85}Mn_{0.15}O_z$, 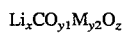 $LiCo_{0.95}Mn_{0.05}O_z$, $Li_{1.02}Co_{0.97}Mn_{0.03}O_z$, $LiCo_{0.97}Ti_{0.03}O_z$, and $LiCo_{0.97}Cu_{0.03}O_z$, wherein z is from 1.7 to 2.3.

Among these, $LiCoO_2$, $Li_{0.97}CoO_z$, $LiCo_{0.75}Mn_{0.25}O_z$, $LiCo_{0.95}Mn_{0.05}O_z$ and $Li_{1.02}Co_{0.97}Mn_{0.030}O_z$ are particularly preferred.

These positive electrode active materials can be synthesized by a process comprising mixing a lithium compound and a transition metal compound and calcining the mixture, or a solution reaction. The former calcination process is preferred. The calcining temperature is selected so that a part of the mixture may be decomposed and melted, preferably from the range of from 250° to 2000° C., more preferably of from 350° to 1500° C. The calcination is conducted in air, an oxygen-rich air (oxygen content: 30% by weight or more), argon or a like atmosphere.

$LiNiO_2$ and $LiMn_2O_4$ as a positive electrode active material may also contain a minor proportion of other elements similarly to $LiCoO_2$. These materials can be synthesized in the same manner as described for $LiCoO_2$. Specific examples of the positive electrode active materials include $LiNiO_2$, $Li_{0.95}NiO_z$, $LiNi_{0.9}Co_{0.1}O_z$, $LiNi_{0.98}V_{0.02}O_z$, $LiNi_{0.9}Fe_{0.1}O_z$, $LiNi_{0.95}Mn_{0.05}O_z$, $LiNi_{0.97}Ti_{0.03}O_z$, $LiNi_{0.97}Cu_{0.030}O_z$, $LiMn_2O_4$, $Li_{0.95}Mn_2O_z$, $LiMn_{1.8}Co_{0.1}O_z$, $LiMn_{0.9}Fe_{0.1}O_z$, $LiMn_{0.97}Ti_{0.03}O_z$, and $LiMn_{0.97}Cu_{0.03}O_z$, wherein z is from 1.7 to 2.3.

The above chemical formulae given to positive electrode active materials are those in the state before charging, i.e., in the form of a positive electrode active material precursor. Therefore, when a battery is in use, the proportion of Li is reduced by charging as compared with that described above.

The positive electrode active materials is contained in the nonaqueous secondary battery in an amount of 1 to 100 g.

The negative electrode active material which can be used in the present invention is a substance capable of intercalating and deintercalating a lithium ion. Specific examples of such the substance include Li-containing metal oxides represented in the form of the negative electrode active material precursors, such as $LiNi_{VO4}$, $LiCoVO_4$, SnO, $SiSnO_3$, and $SnO_2$; calcined carbonaceous materials; spinel compounds, such as $TiS_2$, $LiTiS_2$, $WO_2$, and $Li_xFe(Fe_2O_4)$ wherein x is from 0.7 to 1.3; lithium compounds of $Fe_2O_3$; $Nb_2O_5$, iron oxides (e.g., FeO, $Fe_2O_3$, and $Fe_3O_4$), cobalt oxides (e.g., CoO, $Co_2O_3$, and $Co_3O_4$), and other lithium alloys. Preferred of them are Li-containing metal oxides (e.g., $LiNi_{VO4}$, $LiCoVO_4$, SnO, $SiSnO_3$, and $SnO_2$) and calcined carbonaceous materials.

Suitable combinations of positive electrode active material (represented in the form of precursor)/negative electrode active material (represented in the form of precursor) include (i) $LiCoO_2$/SnO, $LiCoO_2/SnSiO_3$, $LiNiO_2$/SnO, $LiNiO_2/SnSiO_3$, $LiMn_2O_4$/SnO, $LiMn_2O_4/SnSiO_3$ (the charging cut-off voltage of combinations (i) is preferably 3.9 to 5.0 V, more preferably 4.0 to 4.6 V, most preferably 4.1 to 4.4 V); (ii) $LiCo_{O2}/LiCoVO_4$, $LiNiO_2/LiCoVO_4$, and $LiMn_2O_4/LiCoVO_4$ (the charging cut-off voltage of combinations (ii) is from 3.5 to 4.2 V, more preferably 4.0 to 4.2 V); (iii) $LiCoO_2/SnO_2$, $LiNiO_2/SnO_2$, and $LiMn_2O_4/SnO_2$ (the charging cut-off voltage of combinations (iii) is preferably from 4.0 to 4.6 V, more preferably 4.1 to 4.3 V); (iv) $LiCoO_2$/calcined carbonaceous material, $LiNiO_2$/calcined carbonaceous material, and $LiMn_2O_4$/calcined carbonaceous material (the charging cut-off voltage of combinations (iv) is preferably from 4.0 to 4.6 V, more preferably 4.1 to 4.3 V); and (v) $LiCoO_2/Li_{0.8}$—$Al_{0.2}$ alloy, $LiNiO_2/Li_{0.8}$—$Al_{0.2}$ alloy, and $LiMn_2O_4/Li_{0.8}$—$Al_{0.2}$ alloy (the charging cut-off voltage of combinations (v) is preferably from 4.0 to 4.7 V). More preferred of these combinations are $LiCoO_2$/SnO, $LiCoO_2/SnSiO_3$, $LiNiO_2$/SnO, $LiNiO_2/SnSiO_3$, $LiMn_2O_4$/SnO, $LiMn_2O_4/SnSiO_3$, $LiCoO_2/LiCoVO_4$, $LiNiO_2/LiCoVO_4$, $LiMn_2O_4/LiCoVO_4$, $LiCoO_2/SnO_2$, $LiNiO_2/SnO_2$, $LiMn_2O_4/SnO_2$, $LiCoO_2$/calcined carbonaceous material, $LiNiO_2$/calcined carbonaceous material, and $LiMn_2O_4$/calcined carbonaceous material. $LiCoO_2$/SnO, $LiCoO_2/SnSiO_3$, $LiNiO_2$/SnO, $LiNiO_2/SnSiO_3$, $LiMn_2O_4$/SnO, and $LiMn_2O_4/SnSiO_3$ are most preferred.

The terminology "a mixture of the positive electrode active material" as used herein refers to a mixture comprising a positive electrode active material, a conducting agent, a binder, and the like. More concretely, the mixture of the positive electrode active material preferably comprises 50 to 99 parts, more preferably 70 to 98 parts, most preferably 85 to 96 parts, by weight of a positive electrode active material; 1 to 50 parts, more preferably 2 to 20 parts, most preferably 3 to 10 parts, by weight of a conducting agent; and 0.1 to 15 parts, more preferably 0.2 to 5 parts, most preferably 0.3 to 2 parts, by weight of a binder. The mixture may further contain a dispersant and other additives.

The acid containing at least one of P, B, Si, Mo, and W which is to be contained in the mixture of the positive electrode active material includes phosphoric acid, boric acid, silicic acid, molybdic acid, and tungstic acid.

The term "phosphoric acid" as used herein means all the acids resulting from hydration of diphosphorus pentoxide, such as orthophosphoric acid, metaphosphoric acid, pyrophosphoric acid, triphosphoric acid, and tetraphosphoric acid, with orthophosphoric acid and pyrophosphoric acid being preferred.

The term "boric acid" as used herein means all the oxoacids resulting from hydration of diboron trioxide, such as orthoboric acid, metaboric acid, and tetraboric acid, with orthoboric acid and metaboric acid being preferred.

The term "boric acid" as used herein means orthosilicic acid, metasilicic acid, mesodisilicic acid, mesotrisilicic acid, mesotetrasilicic acid, and so on, with orthosilicic acid and metasilicic acid being preferred.

The term "molybdic acid" as used herein means orthomolybdic acid, paramolybdic acid, metamolybdic acid, etc., with orthomolybdic acid being preferred.

The term "tungstic acid" as used herein means orthotungstic acid, paratungstic acid, metatungstic acid, etc., with orthotungstic acid being preferred.

A part or the whole of the hydrogen atoms of these acids may form a salt with ammonium, an alkali metal or an alkaline earth metal.

If the amount of the acid or a salt thereof is too small, the effect of addition is insubstantial. If it is excessive, the amount of the positive electrode active material is reduced to reduce the capacity. From these considerations, the acid or a salt thereof is preferably added in an amount of from 0.02 to 10% by weight, more preferably from 0.05 Lo 7% by weight, most preferably from 0.2 to 5% by weight, based on the weight of the positive electrode active material. The acid is preferably added as such or in the form of an ammonium salt, a lithium salt, a sodium salt or a potassium salt.

The acid or a salt thereof should be added after the preparation of a positive electrode active material. If it is added in the course of the preparation of a positive electrode active material, for example, as a part of the raw material to be calcined, there are unfavorable tendencies that the resulting battery fails to fully exhibit its performance and that the effect of addition is not fully obtained. The acid or a salt thereof can be added, for example, by a method in which the acid or a salt thereof is dissolved in a solvent, e.g., water or an alcohol, putting a positive electrode active material into the solution, and, after stirring, the solvent is removed to adhere the acid or a salt thereof onto the vicinities of the surface of the positive electrode active material; a method in which the acid or a salt thereof is added to a slurry (coating composition) containing a positive electrode active material, and the acid or a salt thereof is adhered to the vicinities of the surface of the positive electrode active material while the applied coating composition is dried; a method in which a solution of the acid or a salt thereof is applied to a positive electrode after coating or after compressing by spraying or impregnation; or a method in which the acid or a salt thereof is previously added to an electrolytic solution and made to migrate and adsorb onto the surface of a positive electrode active material. These methods have their several characteristics and are selected appropriately according to the situation.

The nonaqueous electrolytic solution which can be used in the nonaqueous secondary battery of the present invention is a nonaqueous electrolyte which is liquid in the form of use at normal temperature (an electrolyte which is solid per se but can be used as liquid as dissolved in a solvent is included) and has a molecular weight of less than about 10,000. Suitable nonaqueous electrolytic solutions consist of at least one aprotic organic solvent and a lithium salt soluble in the solvent. Examples of the aprotic organic solvent includes ethylene carbonate, propylene carbonate, butylene carbonate, dimethyl carbonate, ethylmethyl carbonate, diethyl carbonate, methyl propionate, ethyl propionate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, phosphoric triesters, trimethoxymethane, dioxolane derivatives, sulfolane, 3-methyl- 2-oxazolidinone, propylene carbonate derivatives, tetrahydrofuran derivatives, ethyl ether, 1,3-propanesultone and a mixture thereof. Among these, ethylene carbonate, diethyl carbonate, ethyl propionate, propylene carbonate, butylene carbonate, dimethyl carbonate and ethylmethyl carbonate are more preferred. Further, ethylene carbonate or a mixture of ethylene carbonate and diethyl carbonate or dimethyl carbonate is most preferred. Examples of the lithium salts soluble in these solvents include $LiClO_4$, $LiBF_4$, $LiPF_6$, $LiCF_3SO_3$, $LiN(CF_3SO_2)$, $LiCF_3CO_2$, $LiAsF_6$, $LiSbF_6$, $LiB_{10}Cl_{10}$, $Li(1, 2\text{-dimethoxyethane})_2ClO_4$, lower fatty acid lithium salts, $LiAlCl_4$, LiCl, LiBr, LiI, chloroboran lithium, lithium tetraphenylborate and a mixture thereof. Among these, $LiBF_4$ and $LiPF_6$ are particularly preferred.

Further, the nonaqueous electrolytic solutions are preferably a mixture of diethyl carbonate and $LiPF_4$ or a mixture of dimethyl carbonate and $LiPF_6$. The water content of the electrolytic solution is preferably not higher than 1000 ppm, more preferably not higher than 100 ppm, and most preferably not higher than 20 ppm.

The present invention is not limited by the other elements constituting the battery or techniques for producing the battery. For example, JP-A-6-325767 and JP-A-6-3 46523 can be referred to for the details of a separator, a volume ratio of a positive electrode to a negative electrode, a conducting agent, a binder, a support for a mixture of an electrode active material, methods of coating, drying, cutting, dehydration, and compression of a mixture of an electrode active material, the surface of a support, charging of a sheet battery, a lead tab, an insulating tape, a core, winding, web handling, a stopping tape, a battery case, an insulating sheet, insertion of an electrode, beading, a sealant, measurement of leakage current and insulation, a ratio of an electrolytic solution to an active material, a gas phase inside the battery, a gasket, a sealing plate or cap, a battery container, a safety valve, a safety element, a method of sealing, throttling of a battery case, insulation of the periphery of a cap, washing of members, tolerance of members, washing of the battery, post-treatment of the battery, exterior coating, a set of batteries, charging, and equipment used for battery production.

The present invention will now be illustrated in greater detail with reference to Examples, but it should be understood that the present invention is not construed as being limited thereto. Unless otherwise indicated, all the percents and parts are by weight.

Method 1 for Preparation of Battery:

Lithium carbonate and cobalt oxide (a mixture of $Co_3O_4$ and CoO; average particle size: 4.2 μm) were mixed at a Li:Co atomic ratio of 1:1. The resulting mixture had a density of 0.75 g/cm³. The mixture was calcined in air at 750° C. for 3 hours and then at 900° C. for 6 hours to prepare $LiCoO_2$, which was ground to powder having an average particle size of 8.6 μm by a high-speed air flow impact method. The powder had a specific surface area of 0.45 m²/g. The proportion of particles having a diameter of from 3 to 15 μm was 87% by weight of the total particles.

Eighty-five F, arts of the resulting $LiCoO_2$ powder as a positive electrode active material and 85 parts of acetylene black as a conducting agent were mixed in a mortar, and the mixed powder was added to a solution of 0.4 part of carboxymethyl cellulose in 40 parts of water and dispersed in a homogenizer at 15000 rpm for 5 minutes. To the dispersion was added 1.5 part of a carboxy-modified SBR latex "L×2570×5", produced by Nippon Zeon Co., Ltd. (an aqueous dispersion having a solid content of 55%). The mixture was further kneaded in a homogenizer at 15000 rpm for 1 minute, followed by defoaming to prepare a positive electrode slurry. The slurry was applied to each side of a 30 μm thick aluminum foil (1N30-H18) collector to a single spread of 500 g/m² on a dry basis, dried in warm air at 40° C. (dew point: 10° C.) blowing at a velocity of 5 m/sec, compression molded in a roller press under a Linear pressure of 4000 N/cm, and cut to a prescribed size to prepare a positive electrode sheet. The sheet was further dried in dry air heated to 150° C. by means of an infrared heater (dew point: −60° C.).

Eighty-six parts of $SnSiO_3$ as a negative electrode active material precursor were mixed with a conducting agent consisting of 3 parts of acetylene black and 6 parts of graphite, and a binder consisting of 4 parts of polyvinylidene fluoride ("Kynar-301F", produced by Mitsubishi Petrochemical Co., Ltd.), and 1 part of carboxymethyl cellulose was added thereto. The mixture was kneaded with 56 parts of water, followed by defoaming to prepare a negative electrode slurry. The slurry was applied to each side of a 18 μm thick copper foil (TCU-H18) collector at a single spread of 100 g/m² on a dry basis, dried in warm air having a temperature of 40° and a dew point of 10° and blowing at a velocity of 5 m/sec, compression molded in a roller press under a linear pressure of 4000 N/cm, and cut to a prescribed size to prepare a negative electrode sheet. The sheet was further dried in dry air heated to 150° C. by an infrared heater (dew point: −60° C.).

Reference is now made to FIG. 1. Porous polypropylene film separator "Cell Guard 2400", the above-prepared negative electrode sheet, separator, and the above-prepared positive electrode sheet were laminated in this order and rolled up. The roll was put in cylindrical open-top battery case made of nickel-plated iron, which also served as a negative electrode terminal. A 1 mol/l solution of $LiPF_6$ in a 2:2:6 (by volume) mixture of ethylene carbonate, butylene carbonate, and diethyl carbonate was poured into the case as an electrolytic solution. Battery cap having a safety valve, which also served as a positive electrode terminal, was fitted into the top opening of battery case via gasket made of polypropylene to prepare a cylindrical battery shown in FIG. 1.

Method 2 for Preparation of Battery:

The mixture of the positive electrode active material and the mixture of the negative electrode active material were scraped off from the air-dried positive electrode sheet and negative electrode sheet prepared in Method 1, respectively, and the powder was tableted to obtain a positive electrode pellet weighing 450 mg (for a 2032 type coin battery) or 675 mg (for a 2332 type coin battery) and a negative electrode pellet weighing 90 mg (for a 2032 type coin battery) or 135 mg (for a 2332 type coin battery), respectively. The positive electrode and negative electrode pellets were dried in dry air (dew point: −60° C.) heated to 150° C. by an infrared heater and put into a 2032 type or 2332 type coin case together with a separator and 200 1 μl of an electrolytic solution in dry air (dew point: −60° C.) at 25° C.

Method 3 for Preparation of Battery:

Lithium nitrate and nickel hydroxide were mixed at an Li:Ni atomic ratio of 1:1. The mixture was calcined at 700° C. for 10 hours and then at 800° C. for 8 hours to prepare $LiNiO_2$, which was ground to powder having an average particle size of 11 μm by a high-speed air flow impact method. A cylindrical battery was prepared in the same manner as in Method 1, except for using resulting $LiNiO_2$ as a positive electrode active material.

Method 4 for Preparation of Battery:

Lithium nitrate and chemically synthesized manganese dioxide were mixed at an Li:Mn atomic ratio of 1:2. The mixture was calcined at 260° C. for 10 hours, at 300° C. for 3 hours, at 450° C. for 8 hours, and finally at 750° C. for 36 hours to prepare $LiMn_2O_4$, which was ground to powder having an average particle size of 9 μm by a high-speed air flow impact method. A cylindrical battery was prepared in the same manner as in Method 1, except for using the resulting $LiMn_2O_4$ as a positive electrode active material.

Test Method:

Five to ten batteries for each run were charged at a constant current density of 1000 mA/cm$^2$ to a cut-off voltage of 4.1 V and then inserted into a 300 W solenoid type heater and heated up to 350° C. The frequency of rupture of the batteries was examined. To make the testing accelerated, the diameter of vent hole of the safety valve was narrowed to about 1/20 of the ordinary size. Since batteries containing not more than 3 g/cell of $LiCoO_2$ are less liable to rupture, the number of batteries tested in each run was increased to 50. Those containing not more than 1 g/cell of $LiCoO_2$ are still less liable to rupture, 200 batteries were tested in each run, and no safety valve was provided.

EXAMPLE 1

Cylindrical batteries (diameter: 18 mm; height: 65 mm), designated 001 to 040, were prepared in accordance with Method 1, except that 100 parts of the $LiCoO_2$ powder was mixed with 100 parts of water and the compound shown in Tables 1 through 5 below, and water was evaporated to prepare a positive electrode active material. The content of the positive electrode active material in each battery was 17.0 g/cell.

TABLE 1

| Battery No. | Compound Added | Amount of Compound (part) |
|---|---|---|
| 001 | $H_3PO_4$ | 1.00 |
| 002 | " | 0.50 |
| 003 | " | 0.20 |
| 004 | " | 0.05 |
| 005 | $(NH_4)_3PO_4 \cdot 3H_2O$ | 0.50 |
| 006 | $LiH_2PO_4$ | 0.50 |
| 007 | $Na_3PO_4 \cdot 12H_2O$ | 10.00 |
| 008 | " | 0.50 |
| 009 | " | 0.20 |
| 010 | $K_2HPO_4$ | 0.50 |
| 011 | $HPO_3$ | 0.50 |
| 012 | $H_4P_2O_7$ | 0.50 |
| 013 | $Na_5P_3O_{10}$ | 0.50 |

TABLE 2

| Battery No. | Compound Added | Amount of Compound (part) |
|---|---|---|
| 014 | $H_3BO_3$ | 1.00 |
| 015 | " | 0.50 |
| 016 | " | 0.10 |
| 017 | " | 0.05 |
| 018 | $HBO_2$ | 0.50 |

TABLE 2-continued

| Battery No. | Compound Added | Amount of Compound (part) |
|---|---|---|
| 019 | $H_2B_4O_7$ | 0.50 |
| 020 | $Li_2B_4O_7$ | 0.50 |
| 021 | $Na_2B_4O_7$ | 5.00 |
| 022 | $(NH_4)_2O \cdot 5B_2O_3 \cdot 8H_2O$ | 0.50 |
| 023 | $NaBO_2 \cdot 4H_2O$ | 0.50 |

TABLE 3

| Battery No. | Compound Added | Amount of Compound (part) |
|---|---|---|
| 024 | $H_4SiO_4$ | 0.05 |
| 025 | $H_4SiO_4$ | 0.50 |
| 026 | $Na_2SiO_3$ | 0.50 |
| 027 | $K_2SiO_3$ | 0.50 |
| 028 | $Na_2SiO_3 \cdot 9H_2O$ | 0.50 |
| 029 | $LiHSi_2O_5$ | 0.50 |

TABLE 4

| Battery No. | Compound Added | Amount of Compound (part) |
|---|---|---|
| 030 | $H_2MoO_4$ | 1.00 |
| 031 | $H_2MoO_4$ | 0.05 |
| 032 | $(NH_4)MoO_4 \cdot 4H_2O$ | 1.00 |
| 033 | $K_2MoO_4$ | 1.00 |
| 034 | $Na_2MoO_4 \cdot 2H_2O$ | 1.00 |
| 035 | $Li_2MoO_4$ | 1.00 |

TABLE 5

| Battery No. | Compound Added | Amount of Compound (part) |
|---|---|---|
| 036 | $H_2WO_4$ | 1.00 |
| 037 | $H_2WO_4$ | 0.05 |
| 038 | $(NH_4)_{10}W_{12}O_{41} \cdot 5H_2O$ | 1.00 |
| 039 | $K_2WO_4$ | 1.00 |
| 040 | $Na_2WO_4 \cdot 2H_2O$ | 1.00 |

COMPARATIVE EXAMPLE 1

Batteries, designated 041 to 046, were prepared in the same manner as in Example 1, except for using the compound shown in Table 6 below as the compound to be added to the positive electrode active material.

TABLE 6

| Battery No. | Compound Added | Amount of Compound (part) |
|---|---|---|
| 041 | none | — |
| 042 | $H_3PO_4$ | 0.01 |
| 043 | $H_3BO_3$ | 0.01 |
| 044 | $H_4SiO_4$ | 0.01 |
| 045 | lithium carbonate | 0.5 |
| 046 | lithium oxalate | 0.5 |

TEST EXAMPLE 1

Each of the batteries 001 to 046 was tested in accordance with the above-described test method (the diameter of the vent hole was narrowed to 1/20 as a forced testing condition). The results obtained are shown in Table 7.

TABLE 7

| Battery No. | Number of Tested Batteries | Number of Ruptured Batteries |
| --- | --- | --- |
| 001 | 5 | 1 |
| 002 | 5 | 1 |
| 003 | 5 | 1 |
| 004 | 5 | 2 |
| 005 | 5 | 1 |
| 006 | 5 | 1 |
| 007 | 5 | 1 |
| 008 | 5 | 1 |
| 009 | 5 | 3 |
| 010 | 5 | 1 |
| 011 | 5 | 1 |
| 012 | 5 | 1 |
| 013 | 5 | 1 |
| 014 | 5 | 1 |
| 015 | 5 | 1 |
| 016 | 5 | 2 |
| 017 | 5 | 2 |
| 018 | 5 | 1 |
| 019 | 5 | 1 |
| 020 | 5 | 1 |
| 021 | 5 | 1 |
| 022 | 5 | 1 |
| 023 | 5 | 1 |
| 024 | 5 | 2 |
| 025 | 5 | 1 |
| 026 | 5 | 1 |
| 027 | 5 | 1 |
| 028 | 5 | 1 |
| 029 | 5 | 1 |
| 030 | 5 | 1 |
| 031 | 5 | 2 |
| 032 | 5 | 1 |
| 033 | 5 | 1 |
| 034 | 5 | 1 |
| 035 | 5 | 1 |
| 036 | 5 | 1 |
| 037 | 5 | 2 |
| 038 | 5 | 1 |
| 039 | 5 | 1 |
| 040 | 5 | 1 |
| 041 | 5 | 4 |
| 042 | 5 | 4 |
| 043 | 5 | 4 |
| 044 | 5 | 4 |
| 045 | 5 | 4 |
| 046 | 5 | 4 |

It is clearly seen from the results of Table 7 that the batteries according to the present invention have improved safety in case of abrupt temperature rise.

EXAMPLE 2

Coin batteries having a varied size, designated 047 and 048, and cylindrical batteries having a varied size, designated 049 to 054, were prepared in accordance with Methods 2 and 1, respectively, except that 100 parts of the $LiCoO_2$ powder was mixed with 100 parts of water and 0.5 part of $H_3PO_4$, and water was evaporated to prepare a positive electrode active material. For a forced testing condition, coin batteries 047 and 048 had no safety valve, and cylindrical batteries 049 to 054 had its vent hole diameter reduced to 1/20. The size and $LiCoO_2$ content of each battery are shown in Table 8.

TABLE 8

| Battery No. | Diameter × Height (mm) | $LiCoO_2$ Content (g/cell) |
| --- | --- | --- |
| 047 | 20 × 3.2 | 0.400 |
| 048 | 23 × 3.2 | 0.600 |
| 049 | 12 × 10.5 | 1.4 |
| 050 | 12 × 30 | 2.9 |
| 051 | 10 × 44 | 3.8 |
| 052 | 14 × 50 | 7.2 |
| 053 | 17 × 50 | 11.0 |
| 054 | 18 × 65 | 17.0 |

COMPARATIVE EXAMPLE 2

Batteries 055 to 062 having a varied size were prepared in the same manner as in Example 2, except that no compound was added to the positive electrode active material. The size and $LiCoO_2$ content of each battery are shown in Table 9.

TABLE 9

| Battery No. | Diameter × Height (mm) | $LiCoO_2$ Content (g/cell) |
| --- | --- | --- |
| 055 | 20 × 3.2 | 0.400 |
| 056 | 23 × 3.2 | 0.600 |
| 057 | 12 × 10.5 | 1.4 |
| 058 | 12 × 30 | 2.9 |
| 059 | 10 × 44 | 3.8 |
| 060 | 14 × 50 | 7.2 |
| 061 | 17 × 50 | 11.0 |
| 062 | 18 × 65 | 17.0 |

TEST EXAMPLE 2

Each of the batteries 047 to 062 was tested in accordance with the above-described test method. The results obtained are shown in Table 10.

TABLE 10

| Battery No. | Number of Tested Batteries | Number of Ruptured Batteries |
| --- | --- | --- |
| 047 | 200 | 0 |
| 048 | 200 | 0 |
| 049 | 50 | 0 |
| 050 | 50 | 0 |
| 051 | 10 | 0 |
| 052 | 10 | 0 |
| 053 | 10 | 1 |
| 054 | 10 | 1 |
| 055 | 200 | 0 |
| 056 | 200 | 1 |
| 057 | 50 | 1 |
| 058 | 50 | 4 |
| 059 | 10 | 1 |
| 060 | 10 | 2 |
| 061 | 10 | 5 |
| 062 | 10 | 8 |

It is clearly seen that the tendency to rupture in case of abrupt temperature rise depends on size and that the safety of batteries can be improved by the present invention.

While, in Example 2, the effect of the present invention obtained by using $H_3PO_4$ has been demonstrated, the same effect was observed when $(NH_4)_3PO_4 \cdot 3H_2O$, $LiH_2PO_4$, $Na_3PO_4 \cdot 12H_2O$, $K_2HPO_4$, $HPO_3$, $H_4P_2O_7$, $Na_5P_3O_{10}$, $H_3BO_3$, $HBO_2$, $H_2B_4O_7$, $Li_2B_4$, $Na_2B_4O_7$, $(NH_4)_2O.5B_3.8H_2O$, $NaBO_2.4H_2O$, $H_4SiO_4$, $Na_2SiO_3$, $K_2SiO_3$, $Na_2SiO_3.9H_2O$, $LiHSi_2O_5$, $H_2MoO_4$, $(NH_4)MoO_4.4H_2O$, $K_2MoO_4$, $Na_2MoO_4.2H_2O$, $Li_2MoO_4$, $H_2WO_4$, $(NH_4)_{10}W_{12}O_{41}.5H_2O$, $K_2WO_4$, or $Na_2WO_4.2H_2O$ was added to the mixture of the positive electrode active material.

EXAMPLE 3

Cylindrical batteries having a diameter of 18 mm and a height of 65 mm, designated 063 to 124, were prepared in accordance with Method 1, except that 100 parts of the $LiCoO_2$ powder was mixed with 100 parts of water and 0.5 part of $H_3PO_4$, and water was evaporated to prepare a positive electrode active material, and that the electrolytic solution shown in Table 11 was used. The $LiCoO_2$ content in each battery was 17.0 g.

TABLE 11

| Battery No. | Solvent* | Supporting Electrolyte |
| --- | --- | --- |
| 063 | EC/DEC (2/4)** | $LiPF_6$ (1)*** |
| 064 | EC/DEC (2/8) | $LiPF_6$ (1) |
| 065 | EC/DEC/MP (2/2/6) | $LiPF_6$ (1) |
| 066 | EC/DEC/MP (2/6/2) | $LiPF_6$ (1) |
| 067 | EC/DEC/EP (2/2/6) | $LiPF_6$ (1) |
| 068 | ED/DEC/EP (2/6/2) | $LiPF_6$ (1) |
| 069 | EC/DEC/DMC (2/2/6) | $LiPF_6$ (1) |
| 070 | EC/DEC/DMC (2/6/2) | $LiPF_6$ (1) |
| 071 | EC/DMC/EMC/DEC/MP/EP (36/3/6/2/24/29) | $LiPF_6$ (1) |
| 072 | EC/DEC (2/8) | $LiPF_6/LiBF_4$ (0.5/0.5) |
| 073 | EC/DEC (2/8) | $LiPF_6/LiBF_4$ (0.7/0.3) |
| 074 | EC/DEC (2/8) | $LiPF_6/LiBF_4$ (0.9/0.1) |
| 075 | EC/DEC (2/8) | $LiPF_6/LiCF_3SO_3$ (0.5/0.5) |
| 076 | EC/DEC (2/8) | $LiPF_6/LiCF_3SO_3$ (0.7/0.3) |
| 077 | EC/DEC (2/8) | $LiPF_6/LiCF_3SO_3$ (0.9/0.1) |
| 078 | EC/DEC (2/2) | $LiPF_6$ (1) |
| 079 | EC/DEC (2/2) | $LiPF_6$ (0.8) |
| 080 | EC/DEC (2/2) | $LiPF_6$ (0.5) |
| 081 | EC/DEC/MP (2/6/1) | $LiPF_6$ (1) |
| 082 | EC/DEC/MP (2/6/4) | $LiPF_6$ (1) |
| 083 | EC/DEC/MP (2/6/2) | $LiPF_6/LiBF_4$ (0.8/0.2) |
| 084 | EC/DEC/MP (2/6/2) | $LiPF_6/LiBF_4$ (0.9/0.2) |
| 085 | EC/DEC/MP (2/6/2) | $LiPF_6/LiBF_4$ (0.9/0.1) |
| 086 | EC/DEC/MP (2/6/2) | $LiPF_6/LiBF_4$ (1.0/0.1) |
| 087 | EC/DEC/MP (2/8/1) | $LiPF_6$ (1.0) |
| 088 | EC/DEC/MP (2/8/2) | $LiPF_6$ (1) |
| 089 | EC/DEC/MP (2/8/4) | $LiPF_6$ (1) |
| 090 | PC/DEC (2/2) | $LiBF_4$ (1) |
| 091 | PC/DME (2/2) | $LiPF_6$ (1) |
| 092 | PC/DME (2/2) | $LiCF_3SO_3$ (1) |
| 093 | EC/DME (2/2) | $LiBF_4$ (1) |
| 094 | BC/DME (2/8) | $LiBF_4$ (1) |
| 095 | EC/DEC (2/1) | $LiPF_6$ (1) |
| 096 | BC/DEC (2/1) | $LiPF_6$ (1) |
| 097 | BC/DEC (2/2) | $LiPF_6$ (1) |
| 098 | BC/DEC (1/2) | $LiPF_6$ (1) |
| 099 | EC/DMC (2/2) | $LiPF_6$ (1) |
| 100 | EC/DMC (2/2) | $LiPF_6$ (1) |
| 101 | EC/MP (2/2) | $LiPF_6$ (1) |
| 102 | EC/EP (2/2) | $LiPF_6$ (1) |
| 103 | EC/DEC (2/2) | $LiBF_4$ (1) |
| 104 | EC/DEC (2/2) | $LiCF_3SO_3$ (1) |
| 105 | EC/DME (2/2) | $LiPF_6$ (1) |
| 106 | EC/DME (2/2) | $LiCF_3SO_3$ (1) |
| 107 | PC/DME (2/2) | $LiPF_6$ (1) |
| 108 | PC/DEC (2/2) | $LiCF_3SO_3$ (1) |
| 109 | PC/DEC (2/1) | $LiPF_6$ (1) |
| 110 | PC/DEC (1/2) | $LiPF_6$ (1) |
| 111 | EC/DEC (2/8) | $LiBF_4$ (1) |
| 112 | EC/DEC (2/8) | $LiCF_3SO_3$ (1) |
| 113 | EC/DEC (2/8) | $LiPF_6$ (0.8) |
| 114 | EC/DEC (2/8) | $LiPF_6$ (0.5) |
| 115 | PC/DME (2/2) | $LiBF_4$ (1) |
| 116 | EC/DEC/BC (2/6/2) | $LiPF_6$ (1) |
| 117 | EC/DEC/DME (2/1/2) | $LiBF_4$ (1) |
| 118 | EC/DEC/PC (2/6/2) | $LiPF_6$ (1) |
| 119 | DEC (1) | $LiPF_6$ (1) |
| 120 | EC/DEC (2/8) | $LiPF_6/LiN(CF_3SO_2)_2$ (0.9/0.1) |
| 121 | EC/DEC (2/8) | $LiPF_6/LiN(CF_3SO_2)_2$ (0.7/0.3) |
| 122 | EC/DEC (2/8) | $LiPF_6/LiN(CF_3SO_2)_2$ (0.5/0.5) |
| 123 | EC/DEC (2/2) | $LiCF_3SO_3$ (1) |
| 124 | EC/DEC/BC (2/6/2) | $LiCF_3SO_3$ (1) |

Note:
*The abbreviations for solvents have the following meanings.
EC: ethylene carbonate
PC: propylene carbonate
BC: butylene carbonate
DMC: dimethyl carbonate
EMC: ethylmethyl carbonate
DEC: diethyl carbonate
MP: methyl propionate
EP: ethyl propionate
DME: dimethoxyethane
**The ratio in parentheses is a mixing ratio of the solvents by volume.
***The number(s) in parentheses is(are) the concentration(s) of the supporting salt(s) (mol/l). For example, "EC/DEC (2/4).$LiPF_6$ (1)" for Battery 063 means a 1 mol/l solution of $LiPF_6$ in a 2:4 by volume mixed solvent of EC and DEC.

TEST EXAMPLE 3

Each of Batteries 063 to 124 was tested by the above-described test method. The results obtained are shown in Table 12.

TABLE 12

| Battery No. | Number of Tested Batteries | Number of Ruptured Batteries |
| --- | --- | --- |
| 063 | 5 | 1 |
| 064 | 5 | 1 |
| 065 | 5 | 2 |
| 066 | 5 | 1 |
| 067 | 5 | 1 |
| 068 | 5 | 1 |
| 069 | 5 | 2 |
| 070 | 5 | 1 |
| 071 | 5 | 1 |
| 072 | 5 | 0 |
| 073 | 5 | 0 |
| 074 | 5 | 0 |
| 075 | 5 | 0 |
| 076 | 5 | 0 |
| 077 | 5 | 1 |
| 078 | 5 | 1 |
| 079 | 5 | 1 |
| 080 | 5 | 1 |
| 081 | 5 | 1 |
| 082 | 5 | 2 |
| 083 | 5 | 0 |
| 084 | 5 | 0 |
| 085 | 5 | 0 |
| 086 | 5 | 0 |

TABLE 12-continued

| Battery No. | Number of Tested Batteries | Number of Ruptured Batteries |
| --- | --- | --- |
| 087 | 5 | 1 |
| 088 | 5 | 1 |
| 089 | 5 | 2 |
| 090 | 5 | 0 |
| 091 | 5 | 2 |
| 092 | 5 | 1 |
| 093 | 5 | 1 |
| 094 | 5 | 1 |
| 095 | 5 | 1 |
| 096 | 5 | 1 |
| 097 | 5 | 1 |
| 098 | 5 | 1 |
| 099 | 5 | 2 |
| 100 | 5 | 1 |
| 101 | 5 | 2 |
| 102 | 5 | 1 |
| 103 | 5 | 0 |
| 104 | 5 | 0 |
| 105 | 5 | 1 |
| 106 | 5 | 2 |
| 107 | 5 | 1 |
| 108 | 5 | 0 |
| 109 | 5 | 1 |
| 110 | 5 | 1 |
| 111 | 5 | 1 |
| 112 | 5 | 0 |
| 113 | 5 | 1 |
| 114 | 5 | 1 |
| 115 | 5 | 1 |
| 116 | 5 | 1 |
| 117 | 5 | 1 |
| 118 | 5 | 1 |
| 119 | 5 | 1 |
| 120 | 5 | 1 |
| 121 | 5 | 1 |
| 122 | 5 | 1 |
| 123 | 5 | 1 |
| 124 | 5 | 1 |

It is clearly seen that the effect of the present invention can be enhanced by proper choice of an electrolytic solution for some unknown reasons (there was observed no clear relationship between the enhancement and the boiling point, etc. of the solvent of the electrolytic solution).

While, in Example 3, the enhanced effect of the present invention has been demonstrated in the case of using $H_3PO_4$ as an acid, the same tendency could be observed with respect to $(NH_4)_3PO_4 \cdot 3H_2O$, $LiH_2PO_4$, $Na_3PO_4 \cdot 12H_2O$, $K_2HPO_4$, $HPO_3$, $H_4P_2O_7$, $Na_5P_3O_{10}$, $H_3BO_3$, $HBO_2$, $H_2B_4O_7$, $Li_2B_4O_7$, $Na_2B_4O_7$, $(NH_4)_2O \cdot 5B_2O_3 \cdot 8H_2O$, $NaBO_2 \cdot 4H_2O$, $H_4SiO_4$, $Na_2SiO_3$, $K_2SiO_3$, $Na_2SiO_3 \cdot 9H_2O$, $LiHSi_2O_5$, $H_2MoO_4$, $(NH_4)MoO_4 \cdot 4H_2O$, $K_2MoO_4$, $Na_2MoO_4 \cdot 2H_2O$, $Li_2MoO_4$, $H_2WO_4$, $(NH_4)_{10}W_{12}O_{41} \cdot 5H_2O$, $K_2WO_4$, and $Na_2WO_4 \cdot 2H_2O$.

EXAMPLE 4

Cylindrical batteries having a diameter of 18 mm and a height of 65 mm and containing a positive electrode active material of 17.0 g/cell, designated 125 to 139, were prepared according to Method 1, except that the compound shown in Table 13 was incorporated into the mixture of the positive electrode active material by method A, B or C described below.

Method A:

A hundred parts of the positive electrode active material, $LiCoO_2$, were mixed with 100 parts of water and the compound of the amount shown in the Table. After stirring the mixture, water was evaporated.

Method B:

The compound was added to the coating composition (slurry) for the positive electrode in the amount shown in the Table per 100 parts of the positive electrode active material.

Method C:

The compressed positive electrode sheet was dipped in a solution of 1 part of the compound in a mixed solvent of 6.4 parts of methanol and 2 parts of water so that the sheet might be impregnated with the compound of the amount shown in the Table per 100 parts of the active material. After stirring the system, the impregnated sheet was dried. The amount of the compound infiltrated into the sheet was calculated from the weight gain measured after drying.

In addition to Methods A to C, it is possible to add the compound to the positive electrode active material by immersing the positive electrode sheet in an electrolytic solution having dissolved the compound and the sheet is gradually polarized positively to adhere the compound to the active material. In,this case, consideration is required so as not to leave the compound in the electrolytic solution. For example, the solution should be exchanged.

TABLE 13

| Battery No. | Compound Added | Method of Addition | Amount of Compound Added (part) |
| --- | --- | --- | --- |
| 125 | $H_3PO_4$ | A | 0.10 |
| 126 | " | B | 0.10 |
| 127 | " | C | 0.10 |
| 128 | $H_3BO_3$ | A | 0.10 |
| 129 | " | B | 0.10 |
| 130 | " | C | 0.10 |
| 131 | $H_4SiO_4$ | A | 0.10 |
| 132 | " | B | 0.10 |
| 133 | " | C | 0.10 |
| 134 | $H_2MoO_4$ | A | 0.05 |
| 135 | " | B | 0.05 |
| 136 | " | C | 0.05 |
| 137 | $H_2WO_4$ | A | 0.05 |
| 138 | " | B | 0.05 |
| 139 | " | C | 0.05 |

TEST EXAMPLE 4

Each of the batteries prepared in Example 4 was tested according to the above-described test method, The results obtained are shown in Table 14.

TABLE 14

| Battery No. | Number of Tested Batteries | Number of Ruptured Batteries |
| --- | --- | --- |
| 125 | 5 | 2 |
| 126 | 5 | 2 |
| 127 | 5 | 2 |
| 128 | 5 | 2 |
| 129 | 5 | 2 |
| 30 | 5 | 2 |
| 131 | 5 | 2 |
| 132 | 5 | 2 |
| 133 | 5 | 2 |
| 134 | 5 | 2 |
| 135 | 5 | 2 |
| 136 | 5 | 2 |
| 137 | 5 | 2 |
| 138 | 5 | 2 |
| 139 | 5 | 2 |

EXAMPLE 5

As is demonstrated below, the effect of improving battery safety in case of abrupt temperature rise is also obtained in the case of using $LiNi_{O2}$ as a positive electrode active material by using the same additive, the same mode of addition, and the same electrolytic solution as used in the case of using $LiCoO_2$.

Cylindrical batteries (diameter: 18 mm; height: 65 mm), designated 140 to 146, were prepared in accordance with Method 3, except that 100 parts of $LiNiO_2$ prepared were mixed with 100 parts of water and each of the compounds shown in Table 15 below of the amount shown, and water was evaporated to prepare a positive electrode active material. The content of the positive electrode active material in each battery was 16.0 g/cell.

TABLE 15

| Battery No. | Compound Added | Amount of Compound (part) |
| --- | --- | --- |
| 140 | $H_3PO_4$ | 0.50 |
| 141 | $NaH_2PO_4$ | 0.50 |
| 142 | $H_3BO_3$ | 0.50 |
| 143 | $Li_2B_4O_7$ | 0.50 |
| 144 | $H_4SiO_4$ | 0.50 |
| 145 | $H_2MoO_4$ | 0.50 |
| 146 | $H_2WO_4$ | 0.50 |

COMPARATIVE EXAMPLE 3

Battery 147 was prepared in the same manner as in Example 5, except for no compound was added.

TEST EXAMPLE 5

Each of Batteries 140 to 147 was tested according to the above-described test method. The results obtained are shown in Table 16.

TABLE 16

| Battery No. | Number of Tested Batteries | Number of Ruptured Batteries |
| --- | --- | --- |
| 140 | 5 | 1 |
| 141 | 5 | 2 |
| 142 | 5 | 1 |
| 143 | 5 | 2 |
| 144 | 5 | 2 |
| 145 | 5 | 2 |
| 146 | 5 | 2 |
| 147 | 5 | 5 |

EXAMPLE 6

As is demonstrated below, the effect of improving battery safety in case of abrupt temperature rise is also obtained in the case of using $LiMn_2O_4$ as a positive electrode active material by using the same additive, the same mode of addition, and the same electrolytic solution as used in the case of using $LiCoO_2$.

Cylindrical batteries (diameter: 18 mm; height: 65 mm), designated 148 to 154, were prepared in accordance with Method 4, except that 100 parts of $LiMn_2O_4$ prepared were mixed with 100 parts of water and each of the compounds shown in Table 17 below of the amount shown, and water was evaporated to prepare a positive electrode active material. The content of the positive electrode active material in each battery was 15.0 g/cell.

TABLE 17

| Battery No. | Compound Added | Amount of Compound (part) |
| --- | --- | --- |
| 148 | $H_3PO_4$ | 0.50 |
| 149 | $NaH_2PO_4$ | 0.50 |
| 150 | $H_3BO_3$ | 0.50 |
| 151 | $Li_2B_4O_7$ | 0.50 |
| 152 | $H_4SiO_4$ | 0.50 |
| 153 | $H_2MoO_4$ | 0.50 |
| 154 | $H_2WO_4$ | 0.50 |

COMPARATIVE EXAMPLE 4

Battery 155 was prepared in the same manner as in Example 6, except for no compound was added.

TEST EXAMPLE 6

Each of Batteries 148 to 155 was tested according to the above-described test method. The results obtained are shown in Table 18.

TABLE 18

| Battery No. | Number of Tested Batteries | Number of Ruptured Batteries |
| --- | --- | --- |
| 148 | 5 | 1 |
| 149 | 5 | 2 |
| 150 | 5 | 1 |
| 151 | 5 | 2 |
| 152 | 5 | 2 |
| 153 | 5 | 2 |
| 154 | 5 | 2 |
| 155 | 5 | 5 |

EXAMPLE 7

The batteries according to the present invention may have a wide variety of combinations of a positive electrode active material and a negative electrode active material as long as the charging cut-off voltage is in the range of from 3.5 to 5 V. Some of the combinations of electrode active materials are shown below.

Batteries 156 to 160 were prepared according to Method 1, except that the electrode active materials shown in Table 19 were used, and that the positive electrode active material was prepared by mixing 100 parts of the substance shown in the Table with 100 parts of water and 0.5 part of $H_3PO_4$ and then removing water by evaporation.

TABLE 19

| Battery No. | Positive Electrode Active Material | Negative Electrode Active Material | Charging Cut-off Voltage (V) |
| --- | --- | --- | --- |
| 156 | $LiCoO_2$ | SnO | 4.6 |
| 157 | $LiNiO_2$ | SnO | 4.2 |
| 158 | $LiMn_2O_4$ | SnO | 4.1 |
| 159 | $LiCoO_2$ | $LiCoVO_4$ | 3.8 |
| 160 | $LiCoO_2$ | calcined carbonaceous material | 4.2 |

COMPARATIVE EXAMPLE 5

Batteries 161 to 165 were prepared in the same manner as in Example 7, except for adding no compound to the positive electrode active material.

TABLE 20

| Battery No. | Positive Electrode Active Material | Negative Electrode Active Material | Charging Cut-off Voltage (V) |
|---|---|---|---|
| 161 | $LiCoO_2$ | SnO | 4.6 |
| 162 | $LiNiO_2$ | SnO | 4.2 |
| 163 | $LiMn_2O_4$ | SnO | 4.1 |
| 164 | $LiCoO_2$ | $LiCoVO_4$ | 3.8 |
| 165 | $LiCoO_2$ | calcined carbonaceous material | 4.2 |

TEST EXAMPLE 7

Each of Batteries 156 to 165 was tested according to the above-described test method, except that the charging was stopped at the charging cut-off voltage shown in Tables 19 and 20. The results obtained are shown in Table 21.

TABLE 21

| Battery No. | Number of Tested Batteries | Number of Ruptured Batteries |
|---|---|---|
| 156 | 5 | 2 |
| 157 | 5 | 2 |
| 158 | 5 | 1 |
| 159 | 5 | 1 |
| 160 | 5 | 3 |
| 161 | 5 | 5 |
| 162 | 5 | 5 |
| 163 | 5 | 4 |
| 164 | 5 | 4 |
| 165 | 5 | 5 |

As is fully described, the present invention provides a nonaqueous secondary battery having improved safety in case of abrupt temperature rise, the battery comprising a positive electrode, a nonaqueous electrolytic solution, and a negative electrode capable of intercalating and deintercalating a lithium ion and having a charging cut-off voltage of from 3.5 to 5 V.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode, negative electrode and an nonaqueous electrolytic solution, wherein the positive electrode comprises a mixture of active material and an acid containing at least one of P, B, Si, Mo, and W or a salt thereof.

2. The nonaqueous secondary battery as claimed in claim 1, wherein the active material of said positive electrode mainly comprises a lithium-containing transition metal oxide.

3. The nonaqueous secondary battery as claimed in claim 2, wherein said lithium-containing transition metal oxide contains at least one of Co, Mn, and Ni.

4. The nonaqueous secondary battery as claimed in claim 1, wherein said positive electrode active material is contained in an amount of 1 to 100 g in the secondary battery.

5. The nonaqueous secondary battery as claimed in claim 1, wherein said acid or a salt thereof is contained in an amount of from 0.05 to 10% by weight based on the active material of said positive electrode.

6. The nonaqueous secondary battery as claimed in claim 1, wherein a nonaqueous electrolytic solution used in said nonaqueous secondary battery comprises ethylene carbonate.

7. The nonaqueous secondary battery as claimed in claim 6, wherein the nonaqueous electrolytic solution used in said nonaqueous secondary battery comprises a mixture of ethylene carbonate and diethyl carbonate.

8. The nonaqueous secondary battery as claimed in claim 6, wherein the nonaqueous electrolytic solution used in said nonaqueous secondary battery comprises a mixture of ethylene carbonate and dimethyl carbonate.

9. The nonaqueous secondary battery as claimed in claim 7, wherein the nonaqueous electrolytic solution used in said nonaqueous secondary battery comprises a mixture of ethylene carbonate, diethyl carbonate and $LiPF_6$.

10. The nonaqueous secondary battery as claimed in claim 8, wherein the nonaqueous electrolytic solution used in said nonaqueous secondary battery comprises a mixture of ethylene carbonate, dimethyl carbonate and $LiPF_6$.

11. The nonaqueous secondary battery as claimed in claim 1, wherein the active material of said negative electrode mainly comprises a lithium-containing metal oxide.

12. The nonaqueous secondary battery as claimed in claim 11, wherein the active material of said negative electrode is a calcined carbonaceous material.

* * * * *